United States Patent [19]
Weisend, Jr. et al.

[11] Patent Number: 5,393,014
[45] Date of Patent: Feb. 28, 1995

[54] PNEUMATIC DEICING DISTRIBUTION VALVE AND SYSTEM

[75] Inventors: Norbert A. Weisend, Jr., Cuyahoga Falls; Alan J. Fahrner, Canton; Robert N. Hohenshil, Doylestown, all of Ohio

[73] Assignee: The B. F. Goodrich Company, Akron, Ohio

[21] Appl. No.: 241,941

[22] Filed: May 12, 1994

Related U.S. Application Data

[63] Continuation of Ser. No. 954,098, Sep. 30, 1992, abandoned.

[51] Int. Cl.6 ............................................. B64D 15/00
[52] U.S. Cl. .............................. 244/134 A; 244/134 R; 137/625.21; 137/625.23
[58] Field of Search .......... 244/134 R, 134 A, 134 D, 244/134 F; 137/625.21, 625.23

[56] References Cited

U.S. PATENT DOCUMENTS

| 1,367,319 | 1/1945 | Wahlberg | 244/134 R |
|---|---|---|---|
| 2,327,046 | 8/1948 | Hunter | 241/134 R |
| 4,146,202 | 3/1979 | Pender | 244/209 |
| 4,253,495 | 3/1981 | Cooke | 137/625.23 |
| 4,561,613 | 5/1983 | Weisend, Jr. | 244/134 A |
| 4,687,159 | 2/1985 | Kageorge | 244/134 A |
| 4,700,745 | 10/1987 | Ellis | 137/625.21 |
| 4,733,834 | 3/1988 | Phillips, II | 244/134 A |
| 4,779,823 | 11/1988 | Ely et al. | 244/134 A |
| 4,997,006 | 3/1991 | Zlobinsky et al. | 137/625.21 |
| 5,035,380 | 7/1991 | Weisend, Jr. et al. | 244/134 A |
| 5,160,102 | 10/1992 | Hlavac | 244/134 R |

Primary Examiner—Margaret A. Focarino
Assistant Examiner—Christopher P. Ellis
Attorney, Agent, or Firm—Richard A. Romanchik

[57] ABSTRACT

A pneumatic deicing distribution valve 10 includes a body 12, a cap assembly 14 and a rotary member 30 contained therein. Rotary member 30 selectively connects an input port 18 with a plurality of output ports 20 for selectively pressurizing one of a number of deicing apparatuses. A vacuum port 24 places all output ports not being pressurized under vacuum.

21 Claims, 5 Drawing Sheets

PNEUMATIC DEICING DISTRIBUTION VALVE AND SYSTEM

This is a file wrapper continuation of application Ser. No. 07/954,098, filed Sep. 30, 1992, now abandoned.

FIELD OF THE INVENTION

The present invention relates to pneumatic deicing systems, and more particularly, a distribution valve and system for providing pressurized fluid sequentially to a plurality of pneumatic deicing components.

BACKGROUND OF THE INVENTION

Under certain operating conditions aircraft are vulnerable to accumulation of ice on component surfaces. It is well known that such accumulation of ice can lead to disastrous results. A wide variety of systems have been developed for removing ice from aircraft during flight and can be placed into three general categories: thermal, chemical, and mechanical.

The mechanical category of deicing systems operate by distorting the airfoil surface of the aircraft to be deiced. Distortion of the airfoil surface causes cracking in the ice accumulated thereon, and subsequent dispersal of that ice into the air stream passing over the aircraft component. The principal commercial mechanical deicing system is commonly referred to as pneumatic deicing wherein a component (e.g. the leading edge of a wing) of an aircraft is covered with a plurality of expandable, generally tube-like structures inflatable by employing a pressurized fluid, typically air. Upon inflation, the tubular structures tend to expand substantially the leading edge profile of the wing or strut and cracked ice accumulating thereon for dispersal into the airstream passing over the aircraft component. Typically, such tube-like structures have been configured to extend substantially parallel to the leading edge of the aircraft component.

These types of pneumatic deicing systems are provided over a multiplicity of component surfaces representing different portions of the aircraft. Since these different portions need only be deiced periodically under icing conditions, it is more energy efficient to deice the components one at a time in a predetermined sequence, thereby necessitating only one fluid compressor and one fluid magazine. Prior pneumatic deicing systems utilized to accomplish this objective include a plurality of valves which are controlled by a central controller to open and close in the predetermined sequence. Under certain circumstances however, it is not prudent to provide a valve and controlling system for each deicer located on the different aircraft components. This is particularly true when the components to be deiced are extremely thin, such as is found in engine inlets or propellers or fans.

DISCLOSURE OF THE INVENTION

An object of the present invention is to provide a distribution valve for providing pressurized fluid to a multiplicity of pneumatic deicing components in a predetermined sequence while vacuuming the fluid in all pneumatic deicing components which are not being actively pressurized by the distribution valve.

Another object of the present invention is to provide a pneumatic deicing system for distributing pressurized fluid to a multiplicity of pneumatic deicing components in a predetermined sequence.

According to the present invention a pneumatic deicer distribution valve includes a body, an input port for transferring pressurized fluid from a source, a plurality of output ports for transferring pressurized fluid to a plurality of pneumatic deicing components, a rotary means having a transfer port for transferring pressurized fluid from the input port to the output ports, one at a time in a predetermined sequence, and a vacuum chamber and vacuum means for evacuating the body from fluid in every port except that any particular port which is being actively pressurized by the rotary means.

According to another aspect of the present invention a pneumatic deicer distribution system includes a pneumatic deicer distribution valve, a plurality of pneumatic deicing components to be pressurized, a controller for controlling the sequence of providing pressurized fluid through the distribution valve, a solenoid valve responsive to the controller for transferring pressurized fluid from a source either to the distribution valve or to an exhaust port, and a pressurized fluid source.

The present invention conserves energy by inflating pneumatic deicer components one at a time in a predetermined sequence while requiring a singular valve to accomplish this objective, thereby reducing deicer cost and increasing deicer reliability. In addition, the present invention can be utilized for deicing relatively thin air foils because a valve in close proximity to the deiced component is not necessary.

These and other objects, features and advantages of the present invention will become more apparent in light of the detailed description of exemplary embodiments thereof, as illustrated by the drawings.

BEST MODE FOR CARRYING OUT THE INVENTION

Figure 1:
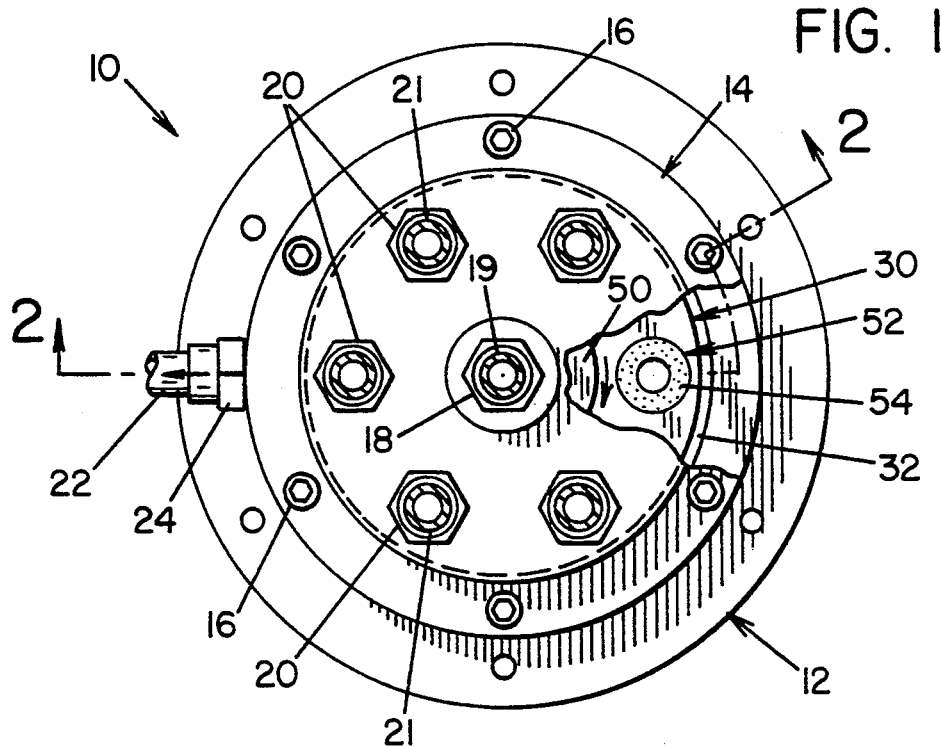
FIG. 1 is a top view of a distribution valve in accordance with the present invention.

Referring now to the drawings wherein like reference numerals designate like or corresponding parts throughout different views, there is shown in FIG. 1 a rotary distribution valve 10 which includes a body 12 having a cap assembly 14 provided thereon which is secured to the body 12 utilizing a plurality of attachment means 16. Pressurized fluid (not shown) is provided into distribution valve 10 utilizing an input connection means 18. The rotary valve 10 includes a plurality of output connection means 20. Pressurized fluid provided into connector 18 is provided to the output connection means 20 one at a time in a predetermined sequence. A vacuum line 22 is connected by a connection means 24 to the body 12 in order to provide a vacuum on each of the output means 20 which are not selected.

Figure 2:
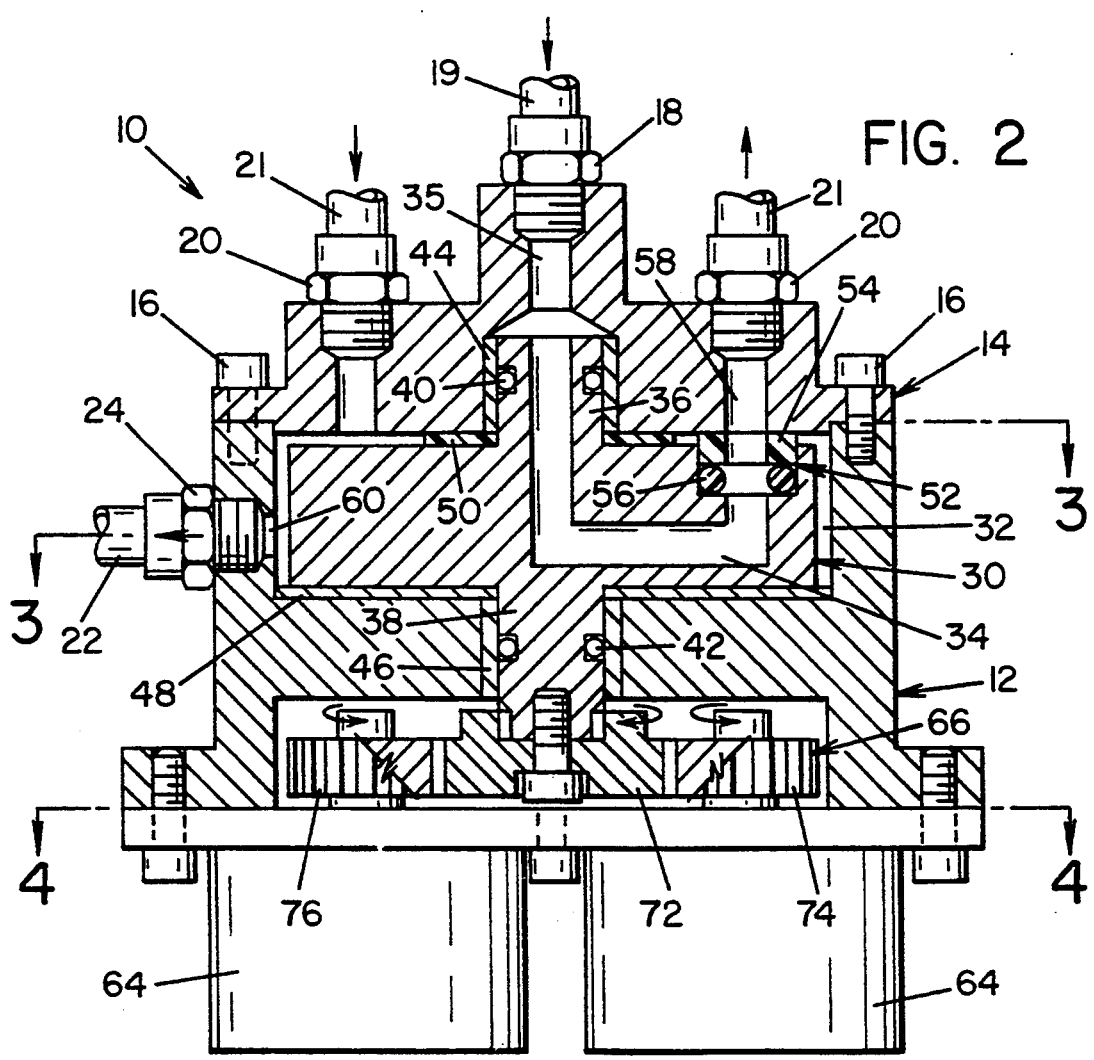
FIG. 2 is a cross sectional view of a distribution valve taken along line 2—2 of FIG. 1.

Referring now to FIG. 2, a rotary distribution valve 10 includes a body 12 and a cap assembly 14 which is attached to the body 12 utilizing a plurality of connection means 16. A rotary member 30 is disposed within a cavity 32 of body 12 and has a passage 34 for transferring fluid. Pressurized fluid is provided from a source (not shown) through an input line 19, through input connection means 18, through a passage 35, through rotary member passage 34, through a selective output connection means 20 in cap assembly 14, through an output line 21 connected to connection means 20 to a selective deicer (not shown). Rotary member 30 has a top protrusion 36 which is rotatably received within the cap number 14 and a bottom protrusion 38 which is rotatably received within the body 12. Although rotary member 30 is illustrated as a cylindrical member, it may also take on other configurations, such as a vane configuration. Elastomeric or plastic o-rings 40, 42 are provided in the protrusions for providing a seal in order to prevent pressurized fluid from blowing by protrusions 36, 38. A top bearing surface 44 and a bottom bearing surface 46 facilitate rotation of their respective protrusions. Bearing surfaces 44, 46 may be comprised of any suitable bearing material, which are well known to those skilled in the art, such as bronze. A bottom pressure bearing 48 is provided underneath the rotary member 30 to facilitate rotation of the rotary member 30 inside cavity 32. Bearing 48 may be comprised of any suitable bearing material, which are well known to those skilled in the art, such as stainless steel. A top bearing plate 50 is provided to facilitate rotation of rotary member 30 also. Bearing plate 50 may be comprised of any suitable bearing material, which are well known to those skilled in the art, such as nylon. A sealing member 52 provides a seal where the duct 34 meets the cab assembly 14 to thereby prevent pressurized fluid from entering the cavity 32 and may be comprised of a bearing member 54 and an o-ring 56, which provides a spring function to impose a force on bearing member 54. Bearing member 54 and o-ring 56 may be comprised of an elastomer or plastic. The cavity 32 is kept under a vacuum provided by a vacuum source (not shown) through a vacuum line 22, through a connection means 24 and through an outlet port 60. Rotary member 30 is rotatably driven by a drive means 64 through a gear means 66. Drive means 64 may be any of a number of drive means well known in the art, such as a DC motor, rotary solenoid, stepper motor, hydraulic motor or pneumatic stepper.

Figure 3:
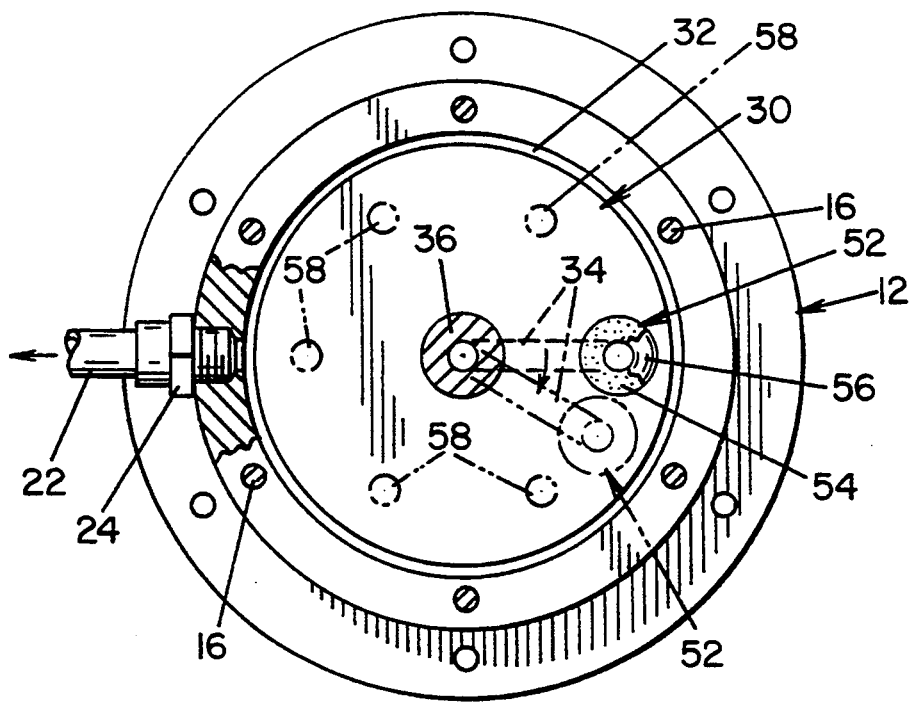
FIG. 3 is a cross sectional view of a distribution valve taken along line 3—3 of FIG. 2.

Referring now to FIG. 3, it can be seen that the rotary member 30 is utilized to put the input line 19 and input connection means 18 in fluid communication with the output connections means 20 and output line 21, or to position the fluid path 34 in between output connection means 20 in order to prevent the flow of fluid to any output connection means 20. When the rotary member positions the fluid passage 34 in connection with a selected output connection means 20 the five remaining nonselected output connection means 20 are placed under vacuum by virtue of the chamber 32 being in fluid connection with the output vacuum line 22 and connection means 24. When the rotary member 30 places the fluid passage 34 in between output connection means 20, then all six output connection lines 21 are placed under vacuum in a similar manner.

Figure 4:
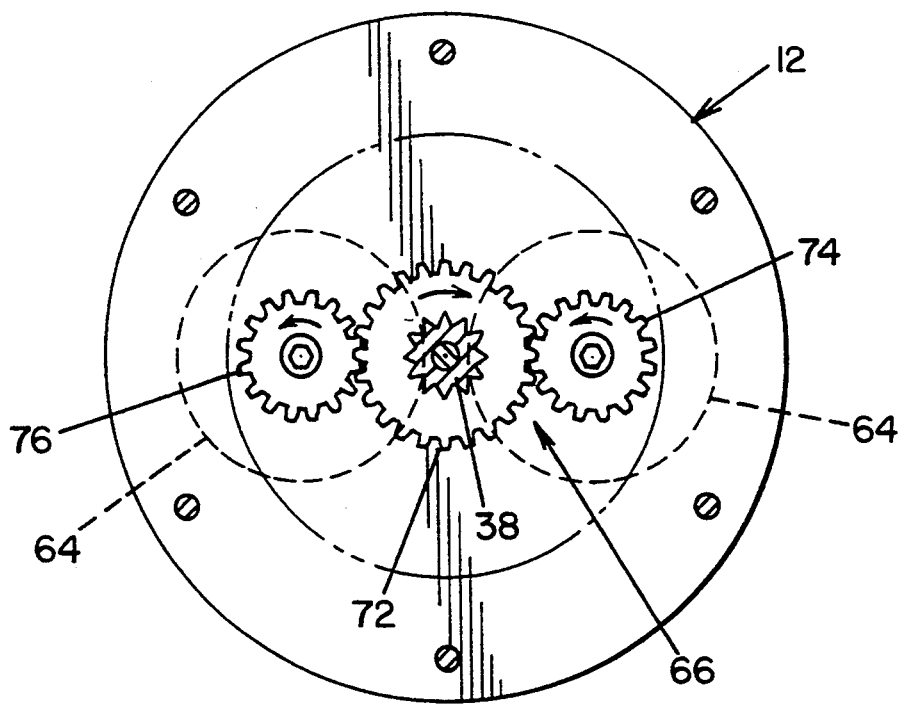
FIG. 4 cross sectional view of a distribution valve taken along line 4—4 of FIG. 2.

Referring now to FIG. 4, gear means 66 includes a central gear 72 which is driven by either one or both of a pair of side gears 74, 76 which are driven by the drive means 64. This configuration is known as a parallel configuration and allows a pair of drive means to act either together or singularly for reliability or redundancy purposes.

Figure 5:
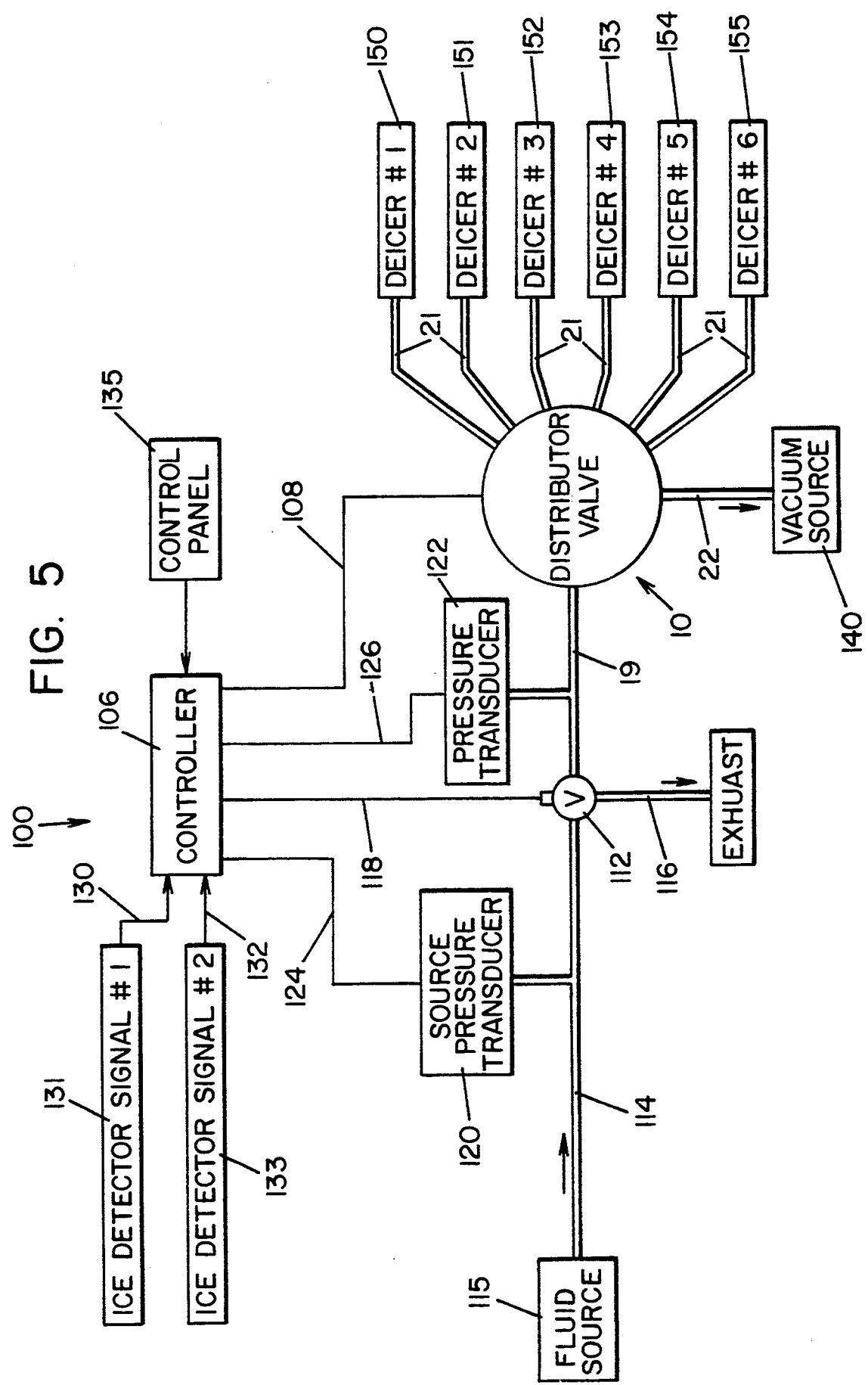
FIG. 5 is a schematic/block diagram of pneumatic deicing system utilizing a distribution valve in accordance with the present invention.

Referring now to FIG. 5, a deicing system 100 includes a rotary distribution valve 10 in accordance with the present invention which is connected to a plurality of pneumatic deicers 150–155. Each pneumatic deicer 150–155 is connected via a plurality of fluid lines 21 to each one of the output connection means 20 of rotary distribution valve 10. A central controller 106 controls the drive motors 64 in order to position the rotary member 30 for selectively activating the deicing systems 150–155 one at a time. Controller 106 controls the distribution valve 10 via a signal line 108. Pressurized fluid is provided via a fluid line 19 to distribution valve 10 from a three-way valve 112 which is also controlled by controller 106. Three-way valve 112 transfers either pressurized fluid from an input line 114 or exhaust fluid through a line 116. Three-way valve 112 is controlled by controller 106 via a line 118. Pressurized fluid is provided on line 114 from a fluid source 115. Pressure transducers 120, 122 may be utilized to provide feedback to controller 106 via lines 124, 126. Controller 106 receives input signals via a pair of lines 130, 132 from ice detectors 131, 133 or a pilot input 135 to activate deicing system in order to deice the different airfoil surfaces. Controller 106 controls the flow of pressurized fluid to the deicers 150–155 on the airfoil surfaces in a predetermined sequence, thereby eliminating the necessity for a pressure fluid source or a control valve for each of the deicers 150–155. All deicers 150–155 not selected are placed under a vacuum through vacuum line 22 which is connected to a vacuum source 140.

Figure 6:
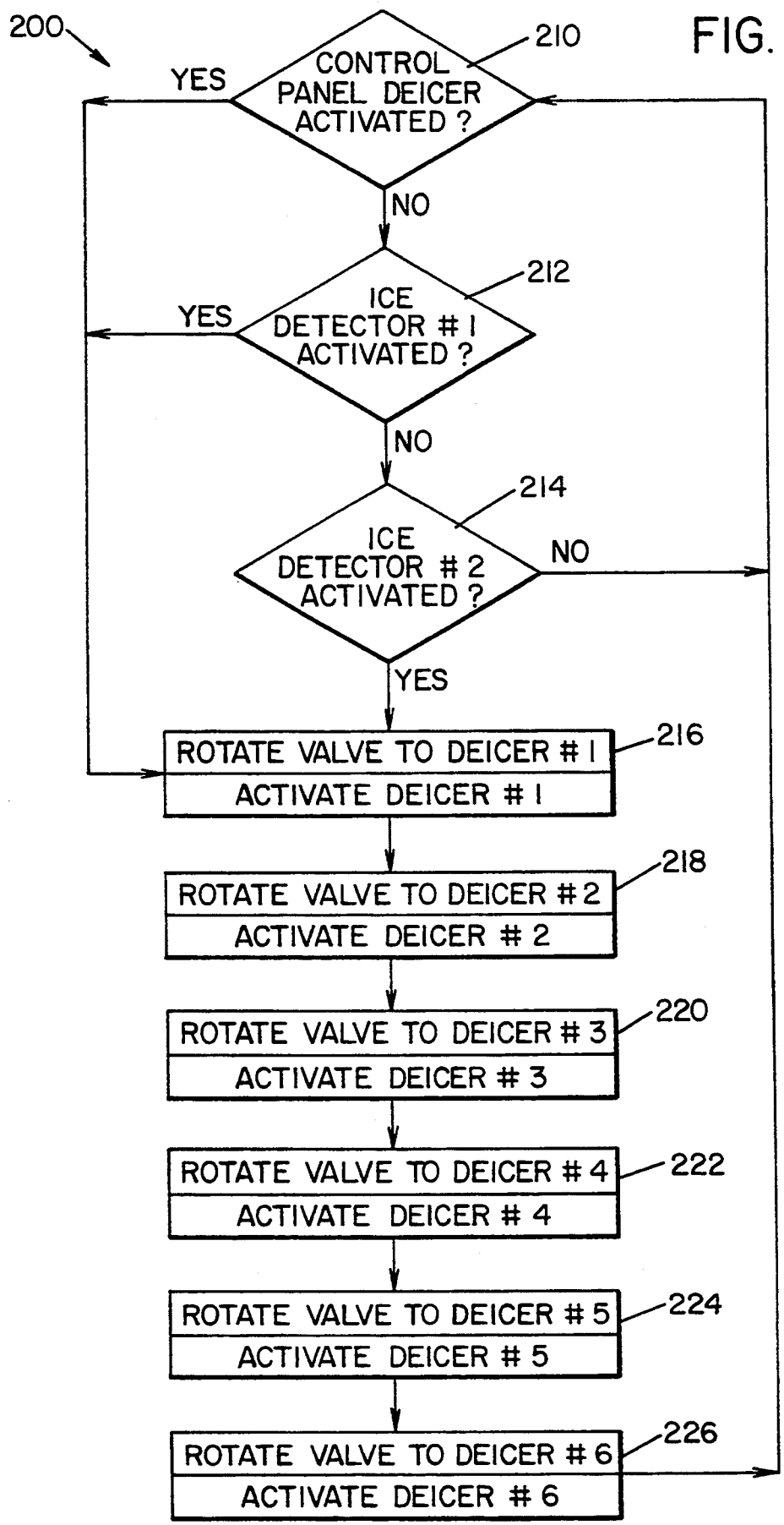
FIG. 6 is a simplified logic flow chart of a deicing subroutine executed by the controller of FIG. 5.

Referring now to FIG. 6, a routine for deicing an aircraft for controller 106 to implement includes a step 210 which queries whether the pilot has activated the deicing system by engaging the appropriate switch on the aircraft control panel. A negative determination of step 210 initiates a step 212 wherein the first ice detector 131 is queried whether or not it has been activated. A negative answer to step 212 initiates a step 214 wherein the second ice detector 133 is queried whether or not it has been activated. A negative response to step 214 starts the loop of steps 210, 212 and 214 over again. A positive answer to any of steps 210, 212, 214 initiates a step 216 wherein the controller rotates the rotary member 30 of FIG. 2 by controlling the motors 64 of FIG. 2 to a position which places the input fluid line 19 in fluid communication with the output 20 for deicer #1, 150 of FIG. 5. Next, controller 106 activates valve 112 of FIG. 5 to open line 19 of FIG. 5 to the pressurized fluid of line 114 of FIG. 5. Deicer #1 is thereby inflated and activated. In a next step 218, controller 106 rotates the rotary member 30 of FIG. 2 to a position ready to activate deicer #2, 151 of FIG. 5$^1$. Controller 106 then activates the valve 112 again to open line 19 to the pressurized fluid of line 114 to thereby inflate deicer #2 and activate it. The next step 220 activates deicer #3 in a manner similar to steps 216 and 218. Deicer #4 is activated in a similar manner in a step 222, deicer #5 is then activated in a similar step 224, and deicer #6 is then activated in a similar step 226. After deicer #6 has been activated, the deicing routine returns to initial step 210 to query the control panel, then ice detector #1, then ice detector #2 to see whether or not the deicing condition still exists.

It is to be noted that although the present invention is described to control six deicers, six is only exemplary and more or less than six deicers may be controlled by the present invention by providing the correct number of ports.

Figure 7:
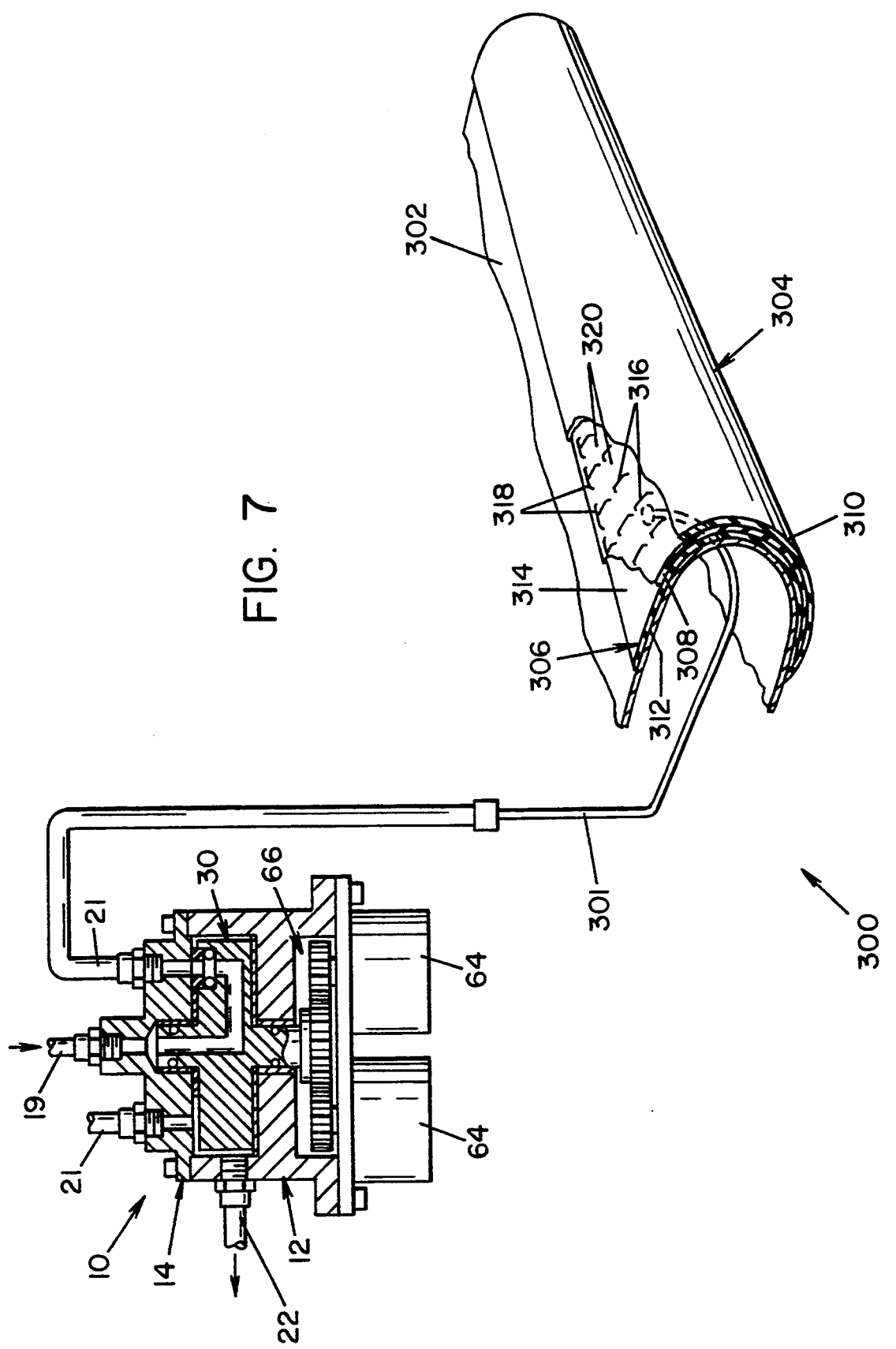
FIG. 7 is a diagrammatic view of a portion of an airplane wing with a deicer pad and distribution valve in accordance with the present invention.

Referring now to FIG. 7, there is shown pneumatic deicing system 300 generally, comprising a fluid distribution valve 10 in accordance with the present invention as illustrated in FIG. 2 joined by conduit means 301 to a pneumatic deicing apparatus 304 which in the embodiment illustrated is attached to an airfoil 302 such as a wing of an aircraft. The deicer apparatus is preferably formed of three layers, each of an essentially constant, rectangular cross-sectional configuration. These layers include a inner or base ply 306, a deformable sheet 308, and an exterior or cover ply 310. The innerror base ply 306 is positioned inwardly of the other two layers 308, 310 and the outer or cover ply 310 is positioned outwardly of the other two layers 306, 308. The inner or base ply 306 is located adjacent to the airfoil 302. It is formed of a sheet of fluid-impervious material such as an elastomer, plastic or rubber, natural or synthetic, or blends thereof. The entire inner face 312 of the base ply 306 is adapted to be secured to the aircraft whereby air or other fluid entrapped outwardly of the outer face 314 of the base ply 306 by the deformable sheet 308 will not permeate or leak inwardly through any seam or other aperture in the aircraft leading edge but will, rather, be retained between the base ply 306 and deformable sheet 308 for inflation and deflation of the deicer 304. Deformable sheet 308 is formed of a stretchable or extensible fabric. Provided within the deformable sheet are strands of essentially inextensible threads 316 to abate the extension of the deformable sheet 308 when pressure is applied. Space warped threads 318 are also incorporated into the fabric to act as anchoring points around which the ends of the inextensible fill threads may be secured. In this manner, inflatable passages or tube-like members are provided. Further detailed description of suitable fluid separation apparatuses is contained in U.S. Pat Nos. 4,687,159, 4,561,613 and 4,779,823, the teachings of which are herein incorporated by reference. Deicers 150-155 described hereinbefore and illustrated in FIG. 5 may be configured as system 304.

Although the invention has been shown and described with exemplary embodiments thereof, it should be understood by those skilled in the art that the foregoing and various other changes, omissions and additions may be made therein and thereto without departing from the spirit and scope of the invention.

We claim:

1. A valve for transferring a pressurized fluid and pulling a vacuum comprising:
    a body having generally cylindrical cavity provided therein;
    a cap disposed on said body having an input port means and a plurality of output port means;
    a rotary member for being rotatably received in said cavity having a duct means provided therein for selectively putting said input port means in fluid communication with a selective one of said plurality of output port means thereby leaving a plurality of nonselected output port means, said rotary member having a diameter less than said cavity;
    first sealing means for sealing said input port to said duct means;
    second sealing means for sealing the selected one of said plurality of output port means to said duct means;
    third sealing means for providing a seal between said rotary member and said cavity; and,
    vacuum port means for voiding said cavity to thereby provide a vacuum to the nonselected said plurality of output port means.

2. A valve according to claim 1, wherein said rotary member is generally cylindrical.

3. A valve according to claim 1, further comprising bearing means disposed between a portion of said cavity and said rotary member.

4. valve according to claim 1, wherein
    said rotary member has a top cylindrical turret and a bottom cylindrical turret;
    said body has a body aperture for rotatably receiving said bottom cylindrical turret;
    said cap has a cap aperture for rotatably receiving said top cylindrical turret, and
    said turrets maintain the alignment of said rotary member.

5. A valve according to claim 1, wherein said first and second sealing means are comprised of o-rings.

6. A valve according to claim 1, wherein said third sealing means is comprised of a bearing means in contact with the wall of said cavity and a spring means for exerting a compressive force on said bearing means.

7. A valve according to claim 1, further comprising motor means for driving said rotary means.

8. A valve according to claim 7, wherein said motor means is comprised of
    a pair of drive motor means; and,
    gear means for connecting said drive motor means in parallel.

9. In combination, a valve according to claim 1 and fluid separation apparatus in fluid connection with said valve comprising an outer surface layer and a plurality of inflatable members positioned beneath the outer surface layer such that fluid inflation of said inflatable members causes reaction movement of said outer surface layer.

10. In combination, a valve according to claim 1 and:
    motor means for driving said rotary member;
    controller means for providing control input to said motor means to determine the rotational position of said rotary member;
    vacuum means for providing a vacuum to said cavity;
    fluid source means for providing pressurized fluid;
    fluid separation apparatus in fluid connection with said valve comprising an outer surface layer and a plurality of inflatable members positioned beneath the outer surface layer such that fluid inflation of said inflatable member causes reaction movement of said outer surface layer, wherein said inflatable members are inflated by said pressurized fluid.

11. A deicing system comprising:
    fluid source means for providing pressurized fluid;
    vacuum source means for providing fluid below atmospheric pressure;
    a valve having: a) a body having generally cylindrical cavity provided therein; b) a cap disposed on said body having an input port means and a plurality of output port means; c) a rotary member for being rotatably received in said cavity having a duct means provided therein for selectively putting said input port means in fluid communication with a selective one of said plurality of output port means thereby leaving a plurality of nonselected output port means, said rotary member having a diameter less than said cavity; d) first sealing means for sealing said input port to said duct means; e) second sealing means for sealing the selected one of said plurality of output port means to said duct means; f) third sealing means for providing a seal between said rotary member and said cavity; and, g) vacuum port means connected to said vacuum source for voiding said cavity to thereby provide a vacuum to the nonselected said plurality of output port means;

motor means for driving said rotary member;

controller means for providing control input to said motor means to determine the rotational position of said rotary member;

fluid separation apparatus comprising an outer surface layer and a plurality of inflatable members positioned beneath the outer surface layer such that fluid inflation of said inflatable members causes reaction movement of said outer surface layer, wherein said inflatable members are inflated by said pressurized fluid.

12. A deicing system according to claim 11, further comprising feedback means for providing pressure signals indicative of the fluid pressure at select points in the system to said controller means.

13. A deicing system according to claim 11, further comprising three way valve means for either passing said pressurized fluid to said valve means or exhausting said valve means to the atmosphere.

14. A valve for transferring a pressurized fluid and pulling a vacuum comprising:
   a body having generally cylindrical cavity provided therein;
   a cap disposed on said body having an input port means and a plurality of output port means;
   a generally cylindrical rotary member for being rotatably received in said cavity having a duct means provided therein for selectively putting said input port means in fluid communication with a selective one of said plurality of output port means thereby leaving a plurality of nonselected output port means, said rotary member having a diameter less than said cavity, a top cylindrical turret and a bottom cylindrical turret, wherein said body has a body aperture for rotatably receiving said bottom cylindrical turret, wherein said cap has a cap aperture for rotatably receiving said top cylindrical turret, and said turrets maintain the alignment of said rotary member;
   first sealing means for sealing said input port to said duct means;
   second sealing means for sealing the selected one of said plurality of output port means to said duct means;
   third sealing means for providing a seal between said rotary member and said cavity comprised of a first bearing means in contact with the wall of said cavity and an o-ring for exerting a compressive force on said bearing means;
   second bearing means disposed between a portion of said cavity and said rotary member;
   vacuum port means for voiding said cavity to thereby provide a vacuum to the nonselected said plurality of output port means; and,
   motor means for driving said rotary means.

15. In combination, a valve according to claim 14 and fluid separation apparatus in fluid connection with said valve comprising an outer surface layer and a plurality of inflatable members positioned beneath the outer surface layer such that fluid inflation of said inflatable members causes reaction movement of said outer surface layer.

16. In combination, a valve according to claim 14 and:
   controller means for providing control input to said motor means to determine the rotational position of said rotary member;
   vacuum means for providing a vacuum to said cavity;
   fluid source means for providing pressurized fluid;
   fluid separation apparatus comprising an outer surface layer and a plurality of inflatable members positioned beneath the outer surface layer such that fluid inflation of said inflatable members causes reaction movement of said outer surface layer, wherein said inflatable members are inflated by said pressurized fluid.

17. A method of deicing an aircraft comprising the steps of:
   providing a plurality of inflatable members positioned on selective portions of the aircraft;
   pressurizing said inflatable members a select one at a time with a pressurized fluid in a predetermined sequence utilizing a rotary distribution valve mean in accordance with claim 1; and,
   evacuating said pressurized fluid from all said inflatable members which are nonselected at any given moment.

18. A method of deicing an aircraft according to claim 17, further comprising the steps of detecting ice accumulation and initiating said pressurizing step.

19. A method of deicing an aircraft comprising the steps of:
   providing a rotary distribution valve in accordance with claim 1;
   providing a plurality of inflatable members positioned on selective portions of the aircraft;
   pressurizing said inflatable members a select one at time with a pressurized fluid in a predetermined sequence utilizing said rotary distribution valve; and,
   evacuating said pressurized fluid from all said inflatable members which are nonselected at any given moment.

20. A method of deicing an aircraft comprising the steps of:
   providing a deicing system in accordance with claim
   pressurizing said inflatable members a select one at a time with said pressurized fluid in a predetermined sequence utilizing said valve and controller means; and,
   evacuating said pressurized fluid from all said inflatable members which are nonselected at any given moment with said vacuum source means.

21. A method of deicing an, aircraft in accordance with anyone of claims 16, 17, 18 or 19, further comprising the step of evacuating all said inflatable members simultaneously at predetermined intervals.

* * * * *